Dec. 20, 1966 T. G. GRIFFITH 3,292,488

PHOTOGRAPHIC PRINTING MEANS AND METHOD

Filed May 6, 1964

INVENTOR.
THEODORE G. GRIFFITH

BY Richard D. Seibel

ATTORNEY

United States Patent Office 3,292,488

Patented Dec. 20, 1966

3,292,488

PHOTOGRAPHIC PRINTING MEANS AND METHOD

Theodore G. Griffith, Downey, Calif., assignor to North American Aviation, Inc.

Filed May 6, 1964, Ser. No. 365,450
19 Claims. (Cl. 88—24)

This invention relates to photographic printing and more specifically concerns color balancing and exposure for color printing.

Present techniques for color integration and exposure determination are inadequate for high quality economical color printing. In most cases it is necessary to make test prints for each new negative to be printed. It is also found that the present techniques are not sufficiently consistent to provide good prints when there is a long elapsed time between printings.

A typical technique for color integration and exposure determination for color printing involves preparing a perfect print from a master negative by trial and error methods. In order to obtain a proper color balance in the perfect print, colored filters are interposed in the light path to adjust the relative color intensities in the printing light. The filters in the printing apparatus are adjusted by trial and error techniques to obtain a master filter pack for the master negative that will give a perfect print with the enlarger lamp in use and for the particular type and batch of printing paper employed. It is found that a change in the enlarger lamp or the batch of paper causes a small change in the color balance and a new balance must be made. The change due to batches of paper is due to normal variations in the emulsion thereon.

After a perfect print is made, and without changing the filters or enlarger settings, the intensity of light in the primary colors red, gree and blue and the intensity of white light is measured in a selected portion of the negative. Commonly the measurement is made of an area having a gray card or on flesh tones or on an area having a known color such as a background wall. The measurement is commonly made with a photodetector having a small aperture located at the easel.

When a print is to be made of a negative of some other subject, it is positioned in the enlarger and the image focused on the easel. A photodetector is then used as with the master negative to measure the intensity of colored and white light and the color balance for this new negative is readjusted. The area selected for measurement is preferably a gray card or an object having some known color. Flesh tones are also employed, however, the color of flesh varies markedly from person to person. There are many negatives that do not include a gray card, flesh tones, or known colors. These must be printed by trial and error techniques to obtain an acceptable color balance. Trial and error techniques are very consuming of printing materials and time since the color of a print cannot be evaluated until the print is dried, a total processing time of about an hour. Even when a gray card is included in a negative, it often occurs that the exposure required, that is the intensity of white light, is in error even though correct color balance is obtained. Because of these factors, it is usual to make a test print and process this print to dryness before any substantial number of prints are made of a new negative.

It is therefore a broad object of this invention to provide an improved technique for color balancing and exposure determination for photographic printing.

Thus in the practice of this invention according to a preferred embodiment there is provided a light trapping tube extending between the lens of an enlarger and a photomultiplier placed at a fixed distance above the printing easel. In the end of the tube adjacent the enlarger lens there is provided a translucent medium which in a preferred embodiment comprises a series of spaced apart translucent matte acetate filters which serve to diffuse and completely mix the colors in the light from the enlarger. These filters are a fixed distance from the enlarger lens. The mixed light is confined by and guided through the tube to the photodetector. Colored filters are interposed in front of the photodetector and the intensity of white and colored light is measured after passing through a negative to be printed. An easily mounted and centered tube arrangement is included.

In order to obtain high quality color prints, an acceptable color print is first made by conventional trial and error techniques from a master negative. Thereafter, the totality of light from the master negative is thoroughly mixed so that all colors from all areas on the negative are integrated. Light intensities are measured for red, green, blue, and white light after the integrated light is confined and guided to a photodetector at the printing easel. When prints are made from a selected negative, the light from all areas of the negative are mixed in a similar manner to the mixing of light from the master negative. The intensity of red, green, blue, and white light is determined as before and the respective intensities adjusted with colored filters. An accurately color balanced and exposed print can immediately be made of the selected negative. The balancing is quickly repeated for any selected negative to be printed.

In a preferred embodiment correct color balance is obtained by placing the light diffusing and trapping tube between the enlarger lens and the photomultiplier at the easel. With the negative to be printed in place in the enlarger the light from the enlarger passes through the negative and impinges upon the photomultiplier aperture. This light is completely integrated or mixed by the matte filters in the tube at a fixed and short distance from the focusing lens so that all of the light from the negative encounters the translucent medium. A colored filter is interposed in front of the photodetector and the intensity of light of that color is adjusted to a preselected standard by insertion of a colored compensating filter between the enlarger light source and the negative. Each of the primary colors is similarly and individually balanced by the use of colored compensating filters. When correct color balance is obtained white light from the enlarger is permitted to fall on the photomultiplier and the aperture of the enlarger is adjusted so that the intensity of the light is at a predetermined standard. The photodetector and light trapping and diffusing tube are then removed from the enlarger and a high quality color print can immediately be made without any requirement for a test print. It has been found that the practice of this invention in an established photographic printing organization has decreased the amount of printing paper wasted in the printing operation from about 24% to about 8% of the total paper purchased. Also, time has been saved because of the almost complete elimination of test prints and trial and error tests.

Thus it is a broad object of this invention to provide an improved method and means for color balancing.

It is another object of this invention to provide an improved method and means for determining exposure in photographic printing.

It is a further object of this invention to provide high quality photographic prints.

It is another object of this invention to provide a photographic apparatus.

Other objects and many of the attendant advantages of this invention will be readily appreciated as the same becomes better understood by reference to the following detailed description when considered in connection with the accompanying drawings wherein.

Figures 1, 2, 3, 4, 5, 6, 7, 8, 9:
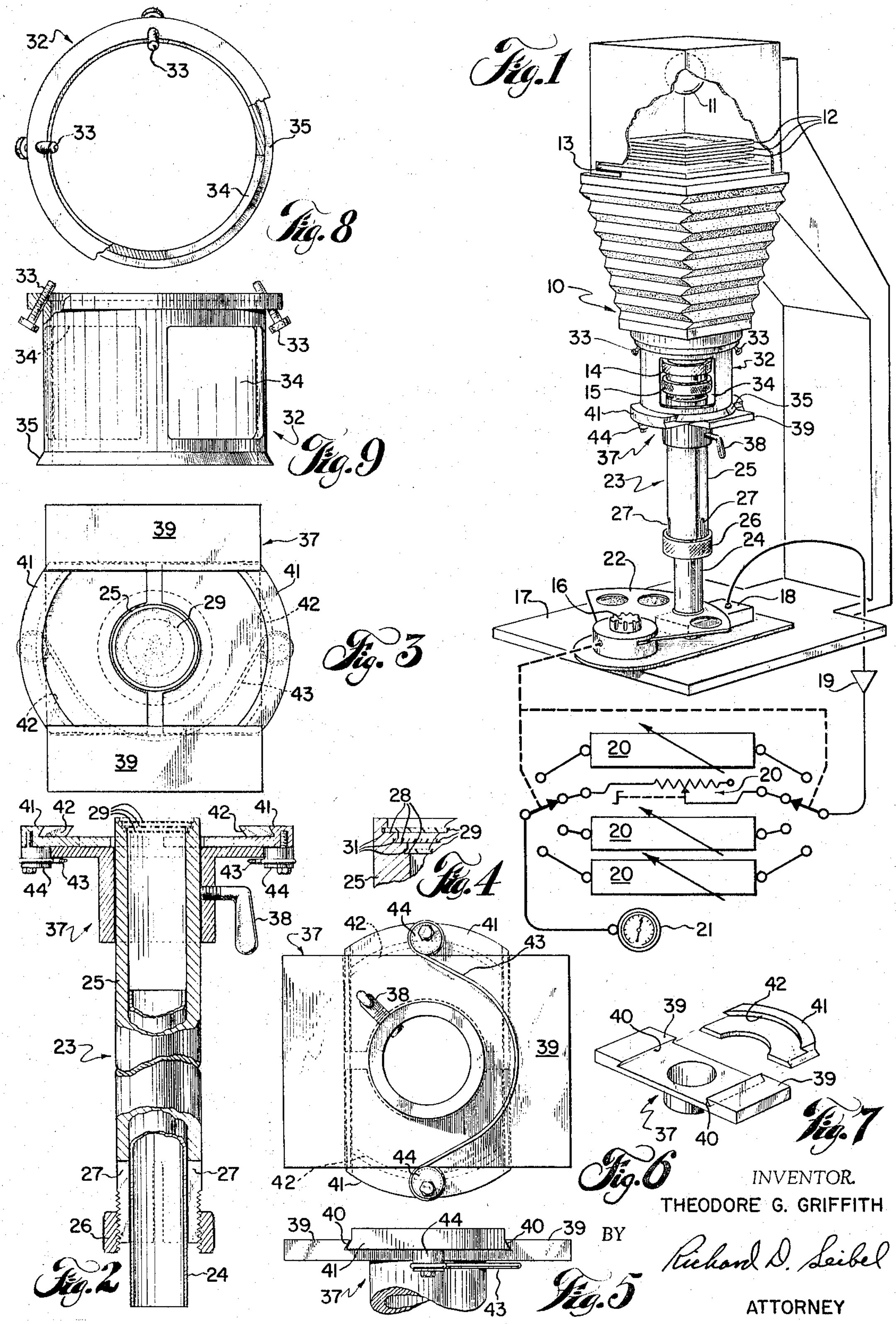
FIG. 1 illustrates a photographic enlarging apparatus incorporating the principles of this invention.
FIG. 2 is a cross section of a light diffusing and trapping tube.
FIG. 3 is a plan view of the light trapping and diffusing tube of FIG. 2.
FIG. 4 is a detail view of a portion of one end of the light trapping and diffusing tube.
FIG. 5 is a side elevation of a means for centering the tube.
FIG. 6 is a bottom view of the means for centering the tube.
FIG. 7 is a detail of elements of the means for centering.
FIG. 8 is a plan view of an adapter for an enlarger for centering the tube.
FIG. 9 is a side elevation of the adapter.

Throughout the drawings like reference numerals refer to like parts. Photographic paper employed in printing color prints employs a layered structure having dyes therein which are sensitive to light of particular colors, for example, red, green, and blue. In a color positive print white light is projected through a color negative and onto a positive paper. A color negative extracts light of the primary colors from the white light. In order to extract these colors the color negative has an appropriate balance of the complementary colors of red, green, and blue, namely, cyan, magenta, and yellow respectively.

The projection lamp used in a photographic enlarger does not inherently have a proper balance of the primary colors to produce uniform white light. It is therefore necessary in color photography to balance the color output of the light by means of the addition of colored correcting filters. These filters are usually interposed between the light source and the negative to be printed in a non-focused portion of the light path so that optical imperfections in the color filters do not interfere with the quality of the ultimate print obtained. These color filters extract quantities of the primary colors from the light beam and thus are of the substractive primary colors cyan, magenta, and yellow. Often color negatives are improperly color balanced because of imperfections in the color of lighting on the subject at the time of exposure of the negative. In order to produce a visually acceptable color print it is necessary to balance the color of the negative to an acceptable color standard. Thus in some instances a card having a neutral gray tone of known characteristics is placed in a portion of the scene that is to be cropped from the final print. Color balance can be obtained by adjusting the color correcting filters so that the gray card wil print as gray in the final positive print. It is apparent, however, that in many instances it is impossible or inconvenient to employ a gray card in a scene and other techniques must be employed for obtaining color balance.

A suitable device for obtaining high quality color prints is illustrated in FIG. 1 which shows an enlarger incorporating the principles of this invention. As illustrated in this embodiment there is provided a printing enlarger 10 which has a light source 11 such as an incandescent lamp, electric arc or the like. A negative holder 13 and negative (not illustrated) are placed in the light path from the light source. Interposed between the negative and the light source are three filters 12 for correcting color. As mentioned previously these filters 12 are of the subtractive primary colors cyan, magenta, and yellow. In order to adjust the color balance of the light passing through the negative these filters have a preselected color density. Color balance is obtained by removing and adding filters of different color densities until a suitable total color density is obtained. Thus a typical photographic printing apparatus would include a selection of colored correcting filters of differing densities which can be substituted for the filters 12 in the enlarger. Alternatively in some types of photographic enlarger the color correcting filters are of uniform and high density and located in such a portion of the optical path that they can be placed partially across this path so that only a portion of the total light beam passes through the filter. The result is the same as when different filters having different densities are interposed into the optical path. Other color correcting filter devices are also employed in some photographic enlargers such as polarized light filters and titled dichroic materials.

Beyond the negative in the optical path of the enlarger there is provided an adjustable aperture or iris 14 and a projection or focusing lens 15. The projection lens is preferably adjustable so that a sharp focus of the negative can be obtained for varying magnifications of enlargement. The aperture in the light path is adjustable so that the intensity of light coming from the enlarger can be varied. An easel 17 is provided in line with and normal to the optical axis of the enlarger. In making prints a positive photographic paper is placed on the easel for exposure. Details of enlargers that may be used in the practice of this invention are well known to those skilled in the art and no further description is needed.

As illustrated in FIG. 1 there is provided a photomultiplier 18 located on the surface of the easel 17 for color balancing and exposure determination purposes. The output of the photomultiplier is amplified by a linear amplifier 19, the output of which is selectively attenuated by one of several adjustable attenuators 20 each of which may comprise a manually adjustable potentiometer as illustrated in FIG. 1. Potentiometer settings are readable from a dial or the like (not shown) so that these may be repeated as needed. The attenuated signal is conveniently displayed on a suitably calibrated meter 21. Three colored filters and a white filter or opening are carried by a pivotally mounted plate 22 located adjacent the photomultiplier 18 so that the photomultiplier can be selectively illuminated with colored or white light. The filters of plate 22 are in the additive primary colors of red, green, and blue which are the colors of light that cause photographic action in color printing. The filter plate 22 is mounted so that any one filter can be placed before the photomultiplier or the light path can be left open so as to illuminate the photomultiplier with colored or white light respectively. A single attenuator 20 is used in conjunction with each of the filters of plate 22 and one attenuator is used in conjunction with white light illumination of the photomultiplier as hereinafter described. The white light intensity measure is employed to determine the correct time of exposure for printing. A single adjustment knob 16 is provided for the filters and the attenuators 20 so that the proper attenuator is used for each color of filter. The filter selection is ganged with a switch that selects one of the attenuators so that an individual attenuator is connected between the amplifier 19 and meter 21 for each selected color filter. It has been found convenient to employ a Speedmaster Neutral Density Analyzer marketed by Midwest Aerial Photographic Survey, Inc., Oklahoma City, Oklahoma, for the attenuators, phototube, amplifier and filters in a single package.

It will be apparent that other arrangements of photodetector are useful in the practice of this invention. Thus, for example, a conventional "light meter" photodetector can be employed with suitable color filters. The intensity of light is indicated on a meter and neutral density or additional color filtration can be added or subtracted to reproduce a selected meter reading.

Between the projection lens 15 of the enlarger and the photomultiplier 18 there is provided a light diffusing and guiding tube 23 which is illustrated in cross section in FIG. 2 and in plan view in FIG. 3. The light guiding or trapping tube or housing 23 comprises an inner cylindrical tube 24 which is slidably movable in an outer cylindrical tube 25. The telescoping arrangement of the two tubes provides a variable length for the light trapping tube. A lock nut 26 is provided on a slightly tapered threaded portion of the outer tube 25 to clamp the telescoped tube to a selected length. Slits 27 are provided in the outer tube so that tightening of the lock nut causes the end of the outer tube to pinch the inner tube and hold it firmly.

At the end of the outer tube 25 opposite the end having a lock nut there are three internal shoulders 28 (FIG. 4) provided to support three translucent layers or matte acetate filters 29. The three acetate disks are of different diameters and the three shoulders are of different sizes so that the filters have a predetermined spaced-apart location. A slight undercut 31 is provided on each of the shoulders so that the matte acetate filters can be snapped into place and held in a fixed position.

Matte acetate is a common designation for a sheet product comprising a translucent polymer of polyethylene terephthalate. This material is marketed in thicknesses of 0.004 and 0.007 inch under the trademark Cronaflex by E. I. Du Pont de Nemours and Company, Inc., Wilmington, Delaware. Although matte acetate is preferred for light diffusing, other translucent materials such as ground, etched, or cloudy glass could also be used in its place. A tangled array of fiber optics, an array of several matte reflective surfaces for multiple reflections, or other light mixing means could also be employed. It is preferred that the material employed for diffusing the light have neutral color, however, as will be apparent from the use of the diffusting tube in color printing this requirement is not essential. As used herein the term matte has a sense that includes bulk as well as surface properties and refers to media that have an effect of translucence, that is, of preventing a clear view or of mixing light by scattering or the like.

For reasons that will become apparent hereinafter, it is convenient in employing the light diffusing and confining tube to attach the tube to the enlarger temporarily. For this purpose there is provided an adapter fitting 32 illustrated in FIGS. 8 and 9, which is secured to the enlarger by set screws 33 or other suitable attaching means which connect to a flange on the enlarger lens holder. The adapter fitting is readily centered on the optical axis of the enlarger by means of the attaching set screws. It is convenient to leave the adapter fitting permanently on the enlarger, therefore cut-out openings 34 are provided so that the aperture iris 14 of the enlarger can be adjusted by hand without removing the adapter fitting. A truncated conical shoulder 35 is provided on the adapter fitting at the end opposite the set screws.

A centering housing 37 illustrated in detail in FIGS. 5–7 along with FIGS. 3 and 4, is slidably mounted on the outer telescoping tube 25 and is provided with a set screw 38 for locking to the outer tube 25. The centering housing 37 comprises a tubular member having a flange portion 39 which has a dovetail groove 40 lying normal to the axis of the tube. A pair of opposed clamping members 41 are slidably mounted in the dovetail groove 40. The clamping members are formed with an internal segment of a conical surface 42 adapted for mating with the conical surface 35 on the adapter fitting 32. A spring 43 is attached to the two clamping members so as to urge them towards each other in the dovetail groove 40. Under the urging forces of the spring 43 the clamping members engage with the conical surface 35 on the adapter fitting on opposite side thereof to support the light confining and guiding tube 23 in position on the enlarger. Adjustable cams 44 are provided on each of the clamping members 41 at the point of attachment of the spring 43. The light trapping tube 23 is secured to the adapter fitting 32 by the clamping members 41 under the force of the spring and is initially carefully centered on the optical axis of the enlarger. The two cams 44 are then rotated into engagement with the flange 39 on the centering housing. The cams are locked into position to provide a stop against the flange 39 so that the light trapping tube is repeatably centered on the optical axis of the enlarger even when quickly snapped into place. The spring loading permits ready detachment of the tube and reattachment to the adapter as needed without time consuming centering of the tube on the optic axis.

In using the integration balancing techniques provided according to the principles of this invention, conventional techiques are initially employed to produce a color print that has a visual pleasing and apparently perfectly colored balanced appearance. This color print is produced from a master negative which is arbitrarily selected and is preferabyl somewhat typical of the negatives normally processed in the printing laboratory. The conventional techniques employed to produce the master color print involve trial and error adjustment of the colored filters 12 in the enlarger to obtain color balanced light. This process may involve several repetitions of the printing operation until an acceptable print is obtained. The acceptable print is usually judged by the operator of the equipment by comparison against the original scene or comparison of colors in areas of the print having a known color composition.

It has been the practice to obtain a measure of the color composition of light from a selected area of the master negative for further printing operations. For this purpose a photomultiplier is often introduced so as to measure the light intensity of a portion of the master negative image. Usually the area selected is that of a conventional gray card provided in the original scene. This has been the preferred technique although color balance is sometimes made on constant background material such as studio walls or on flesh tones. When an arbitrary negative is to be printed a similar setup has been made wherein the arbitrary negative is positioned in the enlarger and a photomultiplier provided to measure an area of the negative. If a gray card is included in the original scene color balance readings are taken thereon and good color balance is normally obtained. In the absence of a gray card in the original scene color readings are taken on flesh tones or some arbitrary selected area having a reasonably well known color. Because of the variation in flesh tones and lighting conditions which may prevail, it is seldom that good color balance is obtained by this technique and it is usually necessary to make at least one trial print before an acceptable quality is produced.

In the practice of this invention according to a preferred embodiment complete mixing of the entirety of light from the color negative is employed for color balancing. It has been found in virtually all instances that excellent color balance is obtained since the average color composition of negatives is relatively constant. Most scenes include areas having mixed color which provide about the same proportions of the complementary colors, and the totality of light when mixed is about neutral in color. Thus, in the practice of this invention color intensity readings are made with mixed light from the master negative after obtaining a perfect print and similar color readings are made for the purpose of adjusting the colored filters 12 before printing an arbitrary negative.

After obtaining a perfect color print of the master negative through conventional color printing techniques and without further adjusting the colored filters 12 between the enlarger light 11 and the negative 13, the light trapping tube 23 is snapped into place on the enlarger and the photomultiplier 18 placed at the opposite end of the tube on the easel 17. The plate 22 having the colored filters is interposed between the photomultiplier and the end of the tube. The set screw 38 is loosened and the outer tube 25 slidably moved toward the enlarger focusing lens 15 so that the end of the tube is a preselected distance from this lens. It has been found convenient to employ a distance of about 1/16 inch which is short enough that no error is introduced due to incident room light and yet is far enough that no damage to the enlarger lens will occur upon use of the light trapping tube.

The light diffusing matte filters are about ⅛ inch apart and the first filter is about ⅛ inch from the end of tube 25. Thus the first translucent layer is at a fixed distance of about $\frac{3}{16}$ inch from the enlarger lens. In order to obtain consistent results from the apparatus the distance from the enlarger lens to the first layer and the distance between adjacent translucent layers is held constant. If these distances are varied, the amount of light transmitted therethrough is changed and proper exposure is not obtained. It is also desirable that the fixed distance to the first matte filter be small since more light must be passed through the enlarger aperture when longer distances are employed to get the same photodetector response. Other distances than here described can be used between the lens and the matte filter so long as substantially all of the light from the negative impinges on the translucent medium.

After securing the outer tube 25 in position adjacent the enlarger lens 15 the lock nut 26 is loosened and the inner tube 24 slidably moved to the filters on the plate 22 adjacent the aperture of the photomultiplier. Thus, the entire light path between the enlarger lens 15 and the photomultiplier 18 is enclosed in opaque material except for the small clearance between the end of the outer tube 25 and the enlarger lens 15. Since the light path from the enlarger is enclosed with opaque materials, it is possible to practice this invention with full room illumination without detrimental results.

The colored filters on plate 22 in front of the photodetector are sequentially and individually placed into the light path and the individual attenuator 20 corresponding to the individual filter is switched into the circuit by the ganged switches connected to the adjustment knob. The attenuator for each filter is then adjusted until a predetermined value is noted on the meter 21 for each primary color. It has been found convenient to employ an arbitrary meter reading that is the same for all three primary colors and for white light. Otherwise the meter readings are recorded for later use with printing operations employing the same batch of printing paper as used for the master negative.

Thus, for example, the red filter on the plate 22 is placed in front of the photomultiplier and the corresponding attenuator 20 adjusted to obtain a predetermined meter reading. The attenuator setting as read from the calibrated adjustment knob is recorded for use in later printing operations. The red filter is then removed and the green filter substituted in front of the photodetector by operating the knob 16 ganged with the attenuator switches. The attenuator now in the circuit is adjusted in the same manner to obtain a predetermined meter reading. The atenuator setting for the green filter is also recorded for later printing operations. Similarly the blue and clear filters are placed before the photodetector and the attenuator settings obtained and read from a calibrated knob or dial are recorded as before. In this manner the color composition of light that has been employed to make the master print from the master negative is measured and recorded.

The attenuator settings for each of the primary colors and for the exposure when a clear path or neutral filter is before the photo cell are characteristic of the particular batch of printing paper employed to make the acceptable color balanced print. Some variation in light response is present between different batches of printing paper and it is preferred to obtain new attenuator settings from a print made from the master negative when a new batch of printing paper is employed. The attenuator settings so determined are maintained constant for all printing operations with a single batch of printing paper and adjustments in color balance are made with the colored filters 12 as hereinafter described to match the color balance which gave an acceptable color print. In effect a proportion of color and a total exposure have been determined for the particular batch of printing paper and repeated exposures with the determined color proportions at the easel will give good color prints despite the condition of the negative or the illuminating light 11.

In order to make a color print from an arbitrarily selected color negative placed in the enlarger, the light trapping tube 23 is snapped into position between the enlarger and the photomultiplier as previously described. Because of variations in exposure conditions it is usually found that the arbitrary selected color negative must be illuminated with light having a different color balance from the color balance of the light employed with the master negative in making the first acceptable color print. The color balance of the illuminating light is adjusted by means of the filters 12 between the light source and the negative so as to provide a color balance at the easel that duplicates the color balance determined after printing the acceptable color print made from the master negative. In the preferred embodiment the color balance is obtained with the aid of the previously recorded attenuator settings for each of the primary colors. To obtain the color balance of the arbitrary negative the settings of the attenuators 20 are adjusted to the values previously determined when printing the master negative for the particular batch of printing paper in use. The red filter of plate 22 is placed before the photomultiplier and the aperture 14 of the enlarger is adjusted until the aforementioned predetermined meter reading is noted on the meter 21. It is preferred that the cyan filter 12 not be used and that the red adjustment be made with the aperture so as to minimize the neutral density introduced by the filters 12 thereby maintaining a reasonable exposure time. The green and blue filters of plate 22 are sequentially placed before the photomultiplier and the magenta and yellow filters 12 respectively are adjusted in density to obtain the aforesaid predetermined value on the meter without changing the attenuator setings from the predetermined values. Because of the neutral density introduced by the magenta and yellow filters a second slight adjustment of the red light by aperture 14 may be required followed by slight readjustment of the blue and green light, each adjustment being made to obtain the predetermined meter reading. Two or three adjustments of the filters 12 are quickly made in sequence and suffice to obtain correct color balance for the arbitrary negative and selected printing paper. After correct color balance is obtained, the colored filters of plate 22 are all removed from before the photomultiplier so that there is a clear light path from the matte acetate to the photodetector and the aperture 14 of the enlarger is adjusted to obtain a convenient exposure time as indicated by a predetermined value on the meter 21. Once a correct color balance has been obtained as described, variation in the aperture does not change the color balance since the total light of each color is varied with any variation of aperture. The aperture adjustment to obtain the exposure time is also made with the corresponding attenuator 20 set at the value found in making the first acceptable color print from the master negative.

For ease of operation and avoidance of color reciprocity effects a uniform time is preferably employed for color printing and the aperture 14 of the enlarger is adjusted so that correct exposure is obtained for the selected time interval. All of the operations of the color balancing and exposure determination are made with the enlarger lens sharply focused on the plane of the easel at the magnification desired in the print. The mixing medium adjacent the lens, of course, keeps the image from being sharply focused on the photodetector.

After the density of the color filters in the enlarger and the correct aperture setting have been determined for an arbitrary color negative and a particular magnification, the light diffusing and trapping tube is removed from the enlarger and the filters of plate 22 and photomultiplier removed from the easel. Color positive paper is then placed on the easel, an exposure made with the unmixed light, and the print developed in a conventional manner. High quality color prints are invariably obtained of the first printing except in cases of gross subject failure where the subject is predominantly one color. Even when subject failure of this type is present color prints are obtained which are reasonbly close to color balance and which can be corrected with a single test print.

Since the intensity of light from the enlarger falls off as the square of the distance from the focusing lens, the aperture setting and time required for correct exposure vary with the magnification used for the print. The photochemical response of printing paper varies with absolute light intensity and with time of exposure, therefore, an exact prediction of proper exposure cannot be made for one magnification even though the aperture setting and exposure time are known for another magnification. Correct exposure is determined only by measurements made at the easel surface or at a fixed distance therefrom. Previously intensity measurements at the easel have necessarily been made on a limited area selected from the area to be printed because of limitations on photodetector aperture size. Inaccuracies result since the area selected is determined arbitrarily by the operator. In the practice of this invention, all of the light from the negative is mixed adjacent the enlarger lens and an intensity determination made at the easel on all of the light.

With the light trapping tube in place on the enlarger the light from the enlarger lens must pass through the three spaced apart, matte acetate filters before impinging on the photomultipler tube. Because of the character of the matte filters dispersion and mixing of the light occurs at each of the three filters. Some reflection also occurs at the filters and the multiple reflections therebetween increase the dispersion of the light. It is found that even with a negative having a very large color difference from side to side, substantially uniform color dispersion and integration is obtained with three spaced apart matte acetate filters 0.004 inch thick. The use of three filters is preferred over two since in extreme negatives some color non-uniformity is still observed with two filters and imperfect color balance may be obtained. More than three filters may be employed although it has been found that three will provide acceptable results in most situations.

The translucent layers of matte acetate are arranged adjacent the enlarger lens so that they are in a region where the light from the enlarger is unfocused. This minimizes the color differences across the light beam. If the translucent layers are placed adjacent the photodetector, the image of the negative is more nearly focused and the color balance is disrupted by local color variations in the negative. Thus, for example, in printing a single color object in a multicolor background, good color balance is obtained with the translucent layers adjacent the enlarger, whereas inaccuracy in the color of the single color object is obtained with the translucent layers adjacent the photodetector.

With the diffusing translucent medium remote from the photodetector the light from this medium is no longer traveling as a beam and the intensity diminishes rapidly with distance. For this reason an opaque housing is provided between the translucent medium and the photodetector to confine and guide the mixed light therebetween. The diffuse light from the matte filters passes along the length of the light trapping tube and impinges on the photomultipler. The light trapping tube prevents dispersion of the diffuse light from the matte acetate filters and directs this light to the photomultipler. In the absence of a light trapping tube an insubstantial and variable quantity of light reaches the photomultipler tube. The diffuse light from the matte acetate filters is somewhat mixed by additional reflections inside the tube to provide still more color homogeniety. Although the tube prevents dispersion of light, it is found that light intensity falls with increasing distance from the diffusing medium so that correct exposure of the printing paper is determined by the photodetector reading.

It should be noted that the internal surface of the light trapping tube is not of critical importance so long as it does not absorb great quantities of light. A smooth but unpolished aluminum surface has been employed without detrimental effects. It should also be noted that colored tube walls or non-neutral diffusing filters will not have an effect upon the color balancing procedure when the light trapping tube is employed. Thus, for example, the tube could just as well be made of brass, plastic, or of other colored material. The reason that the color balance is not affected by the color of the walls of the tube or the diffusing medium is that the attenuator settings are obtained initially with the tube in place and the identical attenuator settings are employed for subsequent printing operations, thus insuring that the relative proportions of colors in the light and the absolute intensity of the light are the same for the arbitrary print as for the acceptable print. Any color imbalance introduced by the tube or the diffusing filters is cancelled by this operation.

It will also be apparent that the same consideration applies to the neutral density introduced by the matte acetate filters and other sources of light loss, and also to the fact that the photomultiplier is not in the plane of the easel, but above it at a fixed distance in the illustrated embodiment. The important element is that the lighting conditions at the photodetector are the same for the arbitrarily selected negative as for the master negative. Thus the print made of the arbitrary negative will be as well color balanced and as properly exposed as the acceptable print made of the master negative. The arrangement provided wherein the photomultiplier is at a fixed distance from the easel rather than a fixed distance from the enlarger gives excellent results in total exposure determination. The photodetector can be at a fixed distance above the easel or below a transparent easel with substantially similar effect. In effect the exposure is determined at the easel and there is no error due to enlargement variations nor difficult calculations required to avoid color reciprocity effects and still obtain proper total exposure. The acceptable print can be made at very low magnification if desired and prints made of other negatives at very high magnification without calculation of exposure ratios. The light trapping tube is merely extended to the aperture of the photodetector and the light color balanced and total exposure determined as described above.

In another embodiment the method of color balancing described can be slightly modified to avoid the use of a photodetector at the easel. This avoids the expense of the photodetector but increases the time required to obtain good color balance. In the practice of the invention according to this embodiment an acceptable color print is made from a master negative as previously described. The light diffusing and trapping tube 23 is attached to the enlarger as previously described, however no colored filters are employed at the easel and no photodetector is provided. Instead a sheet of color printing paper is placed on the easel and the inner tube 24 of the light diffusing and trapping tube is lowered to contact the printing paper. The photographic paper is then exposed with light passed through the master negative and the tube. The color balance and exposure aperture and time are the same as the print made from the master negative.

When the photographic paper is developed it is found that an area of uniform gray is produced. With the light diffusing and trapping tube as described above a circle about one-half inch in diameter of uniform color and exposure is observed. The spot has a cool gray color about that of a Martin No. 1 gray airbrush dye.

When it is desired to prepare a print of an arbitrary negative the light diffusing and trapping tube is attached to the enlarger as above described and a sheet of color printing paper provided on the easel with the enlarger extended to the desired magnification. An approximation of the density of the filters 12 required for a good color print of the arbitrary negative is estimated by the operator and inserted in the enlarger. Exposure of the photographic paper is made with the arbitrary negative and the estimated filter pack and the paper is developed in a conventional manner. The color of the spot produced on the photgraphic paper and the density of the exposure are then compared with the characteristics of the spot printed from the master negative. It is found that very slight differences in color belance can be detected in this manner and variations in the exposure can also be detected. The correct adjustment of the filters 12 to give good color balance and adjustment of the aperture 14 to give correct exposure can then be made. If desired a second test spot can be exposed to verify the correctness of the filter adjustments made. It has been found that if the exposed spot made for an arbitrary negative with the light diffusing and trapping tube placed on the enlarger is the same in color and density as the spot produced by exposure from the master negative, that a color print produced from this negative is of as high quality as that produced when employing the photodetector for color balancing.

Although this embodiment does not completely remove the requirement for making test prints, it should be noted that at least two great advantages are provided over the technique of making full size test prints. One is that a large number of test exposures can be made on a single sheet of printing paper which greatly reduces the waste of materials and another is that comparison is easier between the color balance of an integrated area of uniform color in the exposed spot from an arbitrary negative and the exposed spot from the standard negative than is comparison between two negatives having an arbitrary pattern of colors. By the old technique wherein test prints were made of the actual scene photographed, color blance is made to a large extent to the color preference of the operator. However, as described in this embodiment the operator has a master color standard against which to balance an arbitrary print. A relatively untrained operator can compare the color and density of exposed spots whereas a highly trained operator is required for good color balancing when the test prints are made directly from arbitrary negatives.

A good technique of operation according to this embodiment is to expose small test areas for a large number of negatives and develop all of these before any printing is done. In this manner as many as 80 exposure spots can be made on an 8 x 10 piece of color printing paper and the color balance determined for all of these before any printing is done. It will be apparent that if this technique is substituted for the making of 8 x 10 test prints of each negative that the total quantity of paper and developing chemicals for test purposes is reduced by a factor of 80. It is also found that a substantial savings in time is involved since the comparison of gray exposure spots can be accomplished much more quickly by an operator than the evaluation of test prints.

A type of subject failure that is readily corrected in the practice of this invention is that arising from incorrect illumination. Thus if a scene is photographed with daylight balanced color film when the illumination is from mercury vapor arc lights, a distinct green color is obtained in prints made by conventional techniques. It has been found that with the present invention, correct color balance is obtained in the first print made even when a daylight type negative has been exposed under mercury vapor lights. Similar excellent results are found when daylight type negatives have been exposed under incandescent, fluorescent or mixed mercury vapor and fluorescent illumination. Perfect color balanced prints are also obtained on the first effort when film balanced for incandescent lighting is exposed in sunlight.

It will be readily appreciated that an analogous color balance and exposure determination technique is readily employed in the printing of black and white prints on photographic paper of the type known as multi-contrast or multi-grade paper. Such paper may, for example, give a contrasting image when exposed to blue light and a flat image when exposed to yellow light. Intermediate mixtures of light of these bands provides intermediate grades of contrast. An example of such a paper is that sold under the trademarks Varigam by E. I. du Pont de Nemours and Company, Inc., Wilmington, Delaware, and Polycontrast sold by Eastman Kodak Company, Rochester, New York.

Although a method of color balancing and exposure determination has been described wherein the colored filters are manually adjusted, it is apparent that conventional servo-mechanism and switching devices are readily employed to adjust the filters and the aperture in response to light intensity readings by the photomultiplier. Similarly it is apparent that the photomultiplier and associated colored filters could be fixed to the end of the light trapping tube and this assembly extended to the easel as a unit. It will also be apparent that the light trapping tube can be constructed with a cross section that varies from end to end to accommodate particular enlarging apparatus or photodetectors. Additionally the telescoping and locking arrangement can be modified in many respects as will be clear to one skilled in the art so that multiple telescoping segments may be used or set screw locking means. Bellows can be employed in place of the trapping tube so long as the light absorbed thereby is not high and other extensible devices can be employed.

Obviously many modifications and variations of the present invention are possible in light of the above teachings. It is therefore to be understood that within the scope of the appended claims the invention may be practiced otherwise than as specifically described.

What is claimed is:

1. A photographic accessory comprising:
a first tubular housing;
a shoulder portion at a first end of said first tubular housing including a plurality of undercut grooves on the interior of said housing adjacent one end thereof;
a translucent sheet in each of said undercut grooves extending across said first housing;
means at said first end of said first housing for temporarily attaching said first housing to a photographic enlarger so that said translucent sheets are a fixed distance from the projection lens on the easel side of the projection lens of the enlarger
a second tubular housing telescoping with said first tubular housing; and means for locking said first housing to said second housing to restrict telescoping.

2. A photographic accessory comprising:
an adapter shell having means for securing said shell to a photographic apparatus and a surface in the form of a truncated cone at one end of said adapter shell
a support housing including a tube portion and a flange portion having a dovetail groove transverse to said tube portion;
a pair of opposed clamping members slidably mounted in said dovetail groove, each of said clamping members having a surface in the form of a segment of a truncated cone corresponding to the surface on the adapter shell for detachable securing said housing to said adapter shell;
a locking member on each of said clamping members for limiting movement of said clamping member relative to said support housing;
means for urging said clamping members toward one another;
a first tube slidably mounted in the tubular portion of said support housing and having a plurality of internal shoulders at one end thereof;

a plurality of translucent layers extending across said first tube and onto said shoulders;
a second tube telescoping with said first tube; and
means for locking said first tube to said second tube to restrict telescoping.

3. In a photographic apparatus having a focusing lens, an easel, and photodetector adjacent the easel; a light diffuser comprising:
a housing having opaque sides extending between the focusing lens and the photodetector adjacent the easel for conducting light therebetween, and
translucent means in said opaque housing for diffusing light passing between the focusing lens and the photodetector adjacent the easel.

4. A photographic apparatus as defined in claim 3 wherein said photodetector is a fixed distance from said easel; said translucent means is a fixed distance from said focusing lens; and said housing is of variable length therebetween whereby light from the focusing lens is mixed and intensity of the mixed light is determined adjacent the printing easel for determining correct photographic exposure at the easel.

5. In a photographic apparatus having a focusing lens, an easel and a photodetector adjacent the easel; a light diffuser comprising:
a first tubular housing;
means for detachably securing said first tubular housing to the photographic apparatus between the focusing lens and the photodetector adjacent the easel;
a plurality of translucent layers in said first tubular housing at an end adjacent the means for securing, each of said translucent layers being spaced apart from others of said translucent layers; and
a second tubular housing telescoping with said first tubular housing for extending between said first housing and the photodetector.

6. A photographic apparatus having elements sequentially arranged along an optic axis in the order stated comprising:
a light source;
a plurality of colored filters;
means for holding a negative on the optic axis;
a focusing lens;
means adjacent said focusing lens for mixing light;
an adjustable length light confining and guiding housing;
a photodetector; and
a printing easel.

7. In a photographic enlarger comprising in sequence a light source, color correcting filters, means for holding a photographic negative, a projection lens, and a printing easel; the improvement comprising:
means for diffusing light between the lens and the easel;
means for measuring intensity of light at the easel; and
means for guiding diffuse light between said means for diffusing and said means for measuring whereby correct color balance and exposure are obtainable at the easel for color printing.

8. The structure as defined in claim 7 wherein said means for guiding light comprises:
an opaque tubular housing;
means for adjusting the length of said housing; and
means for detachably securing said housing to the photographic enlarger and wherein;
said means for diffusing light further comprises a plurality of spaced apart translucent layers in said housing adjacent the projection lens of the enlarger.

9. A photographic apparatus as defined in claim 8 wherein said means for securing further comprises:
a support housing surrounding said tubular housing;
a flange member on said support housing and having a dovetail groove;
opposed clamping members slidably mounted in the dovetail groove, each of said clamping members having a surface in the form of a segment of a truncated cone;

adjustable means for limiting movement of said clamping members in the dovetail groove; and
means for urging said opposed clamping members toward one another.

10. A method of color balancing for color photography comprising:
uniformly mixing light from substantially all of the area of a color negative;
confining and guiding at least a portion of said mixed light to a printing surface; measuring the mixed light at the printing surface; and
adjusting relative intensities of colors of said mixed light at said printing surface to a predetermined proportion whereby correct color balance is obtained at said printing surface.

11. A method of color printing comprising:
concentrating light from substantially all of the area of a negative to be printed;
uniformly mixing the concentrated light;
confining and guiding at least a portion of the mixed light to a printing surface;
measuring and balancing the relative color composition of the mixed light at the printing surface to a predetermined proportion;
adjusting the intensity of the mixed light at the printing surface to a predetermined value; and
exposing a printing medium at the printing surface to unmixed light from the negative.

12. A method of color printing comprising the steps of:
determining intensity of light of at least one color at a printing surface and uniformly mixed from substantially all of the area of a first negative that is exposed to light color balanced to provide a first print;
exposing a second negative to light of variable color balance;
measuring and color balancing the light of variable color balance to provide said determined intensity of light of said one color at the printing surface and uniformly mixed from substantially all of the area of said second negative; and
exposing a printing medium at the printing surface to light as balanced in said last mentioned step and as transmitted unmixed from the second negative.

13. A method of color printing comprising:
exposing a photographic printing medium at a printing surface to light uniformly mixed from substantially all of the area of a first color negative that is exposed to light color balanced to provide a first color print for providing a first exposed spot;
exposing a second color negative to light of variable color balance;
measuring and color balancing the light of variable color balance to provide a second exposure spot on a photographic printing medium of light mixed from substantially all of the area of said second color negative so that the color of said second exposure spot is the same as the color of said first exposure spot; and
exposing a photographic printing medium to light as balanced in said last mentioned step and as transmitted unmixed from said second negative.

14. A method of color printing comprising:
printing a color balanced first color print by exposure of a printing medium with focused color-balanced light from a master negative;
mixing the color balanced light from substantially all of the area of said master negative adjacent the means for focusing the light;
measuring the relative intensities of light of different colors in the mixed light at a printing surface;
exposing a second negative to light of variable color balance;
mixing the light from substantially all of the area of said second negative adjacent the means for focusing the light;

measuring the mixed light at a printing surface;

adjusting the color balance of the mixed light from said second negative at a printing surface to the same relative intensities found in said measuring step; and printing a color print at the printing surface with focused color balanced light from said second negative.

15. A method of color balancing for color photography comprising:

color balancing light in a photographic printing apparatus to produce a visually acceptable color print from a first color negative;

passing the color balanced light from said photographic printing apparatus through said first color negative and subsequently through a translucent medium to a photodetector adjacent a printing easel;

measuring the intensity of light of primary colors passing through said first negative with said photodetector;

passing light from said photographic printing apparatus through a second color negative and subsequently through a translucent medium to said photodetector;

measuring the intensity of light of primary colors passing through said translucent medium with said photodetector; and adjusting the color balance of light passing through said second negative with colored filters so as to have the same intensity of primary colors as measured for said first negative.

16. A method as defined in claim 15 further comprising:

measuring the intensity of white light passing through said first negative with said photodetector adjacent the easel; and adjusting the intensity of white light through said second negative to have the same intensity as measured for said first negative.

17. A method as defined in claim 16 wherein said translucent medium comprises a plurality of spaced apart translucent layers adjacent said photographic printing apparatus and remote from said photodetector further comprising:

containing light from said translucent layers in an opaque housing between said layers and said photodetector.

18. A method of color balancing for color photography comprising:

color balancing light in a photographic printing apparatus to produce a visually acceptable color print from a first color negative;

passing the color balanced light from said photographic printing apparatus through said first color negative and subsequently through a translucent medium to a color printing medium on an easel for providing a first exposure spot;

passing light from said photographic printing apparatus through a second color negative and subsequently through a translucent medium to a color printing medium for providing a second exposure spot;

measuring light intensity at the second exposure spot; and adjusting the color balance of light passing through said second negative with colored filters so that said second exposure spot has the same color as said first exposure spot.

19. A method of color printing comprising the steps of:

color balancing light and transmitting it through a first negative to provide a first print;

uniformly mixing said color balanced light transmitted from substantially the entire area of said first negative by interposing a translucent medium between the negative and a printing surface;

measuring and recording the relative intensities of light of different colors in said mixed light at the printing surface;

exposing a second negative to light of variable color balance;

uniformly mixing the light transmitted from substantially the entire area of the second negative by interposing a translucent medium between the negative and a printing surface;

measuring intensity of light of each of said different colors in said mixed light from the second negative at the printing surface;

varying the color balance of the light to the second negative to cause mixed light from said second negative to provide relative intensities of light of different colors that are the same as the relative intensities recorded with the first negative; and exposing a printing medium at the printing surface to light as balanced in said last mentioned step and transmitted unmixed from the second negative.

References Cited by the Examiner

UNITED STATES PATENTS

| | | | |
|---|---|---|---|
| 2,249,033 | 7/1941 | O'Grady | 88—24 |
| 3,161,108 | 12/1964 | Modney | 88—24 |

OTHER REFERENCES

The Journal of Photographic Science, vol. 8, No. 5 Sept.-Oct. 1960, "A Colour Enlarger with a Simple Monitoring Device," Hunt, pages 186–189.

NORTON ANSHER, *Primary Examiner.*

R. A. WINTERCORN, *Assistant Examiner.*